H. Havell,
Scissors.

Nº 22,367.      Patented Dec. 21, 1858.

Witnesses
Daniel F. Tompkins
John T. Tompkins

Inventor
Henry Havell

UNITED STATES PATENT OFFICE.

HENRY HAVELL, OF NEWARK, NEW JERSEY.

MANUFACTURE OF SCISSORS.

Specification of Letters Patent No. 22,367, dated December 21, 1858.

*To all whom it may concern:*

Be it known that I, HENRY HAVELL, of the city of Newark, in the county of Essex and State of New Jersey, have invented a new and useful Improvement in Scissors or Shears; and I do hereby declare that the following is a full, clear, and exact description thereof, reference being had to the accompanying drawings, making a part of this specification, in which—

Figure 1:
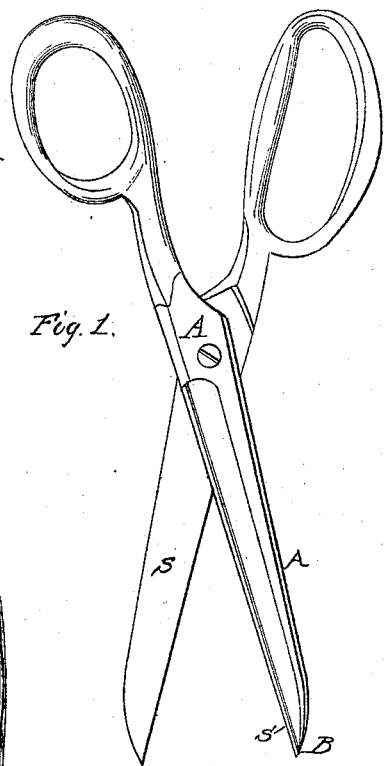
Figure 3:
Figure 2:
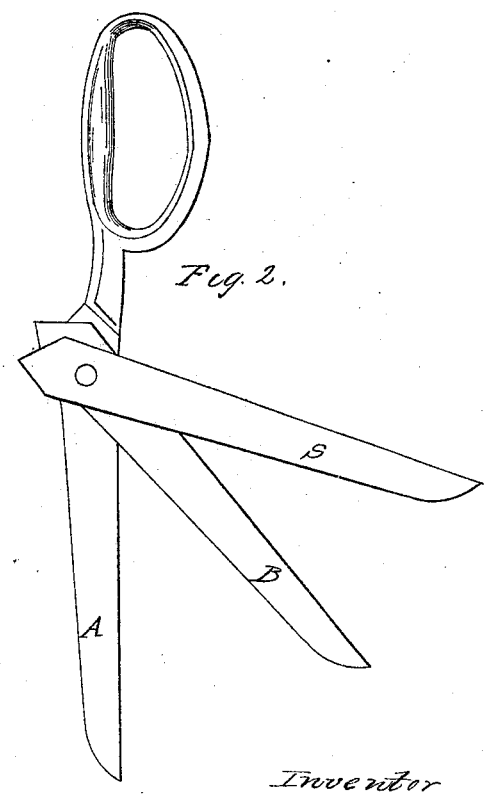

Figure 1 is a perspective view of a pair of scissors constructed in accordance with my improvement. Fig. 2 is a view of one of the blades of the scissors, showing the three component parts of the blade, and Fig. 3 is an edge view of one of the blades, also showing the manner of construction.

The process of manufacturing scissors or shears as now generally conducted is as follows: The blades are first cast and annealed becoming malleable iron. They are then carefully straightened by hand and a steel plate nearly of equal thickness with the iron is welded onto the cast blade. The steel is required to be thus heavy, not for any purpose of after utility, but in order that one part may not be thinner than the other and so become unduly heated and prevent a proper welding of the parts. The steel is also required to be previously forged out into proper shape and thicker at the point than elsewhere.

A high heat is necessary to weld the parts together, and the blades require considerable smithing in order to get them into proper shape. The blades are then taken hardened, tempered, ground and polished and carefully fitted to cut even together by hand. This latter process is rendered necessary from the manner in which the blades are formed,—it is also quite a nice operation and requires considerable time.

My improvement consists in constructing the scissors or shears as follows: I first take the malleable iron blade and place it in a suitable die previously prepared. On the blade I then lay a thin plate of brass, German silver or other suitable metal or composition metal or solder. This plate is represented at *b*, Fig. 2. Upon the plate *b*, I then place a thin plate of steel S, Fig. 2—of uniform thickness—both of these plates *b* and S, are cut out with a press from rolled plates of metal of uniform thickness, thus saving the necessity of any forging of the steel as in the process before mentioned. The plates *b* and S, are cut of the exact size and form required and in such a manner as to fit quite up to the shoulder of the shank of the blade as represented in Fig. 2. The three parts viz: the malleable iron, the composition or solder and the steel being thus adjusted in the die, the whole are struck a single blow with a drop hammer which straightens the parts and brings them all into the required position for being soldered together. They are then bound with fine wire and laid in the furnace and heated until the intermediate or soldering plate *b* fuses, uniting firmly together the steel and iron. The blades thus formed are then at the same heat, hardened after which they are tempered ground and polished. They are then ready without any fitting or adjusting whatever to be put together, the blow of the hammer, when they were in the die having brought all the blades into proper line and of a uniform shape. The steel being carried quite up to the shank of the blade as represented in Fig. 2 and being left quite hard at the joint the blade is rendered much stiffer than in the old method and a better and more lasting joint obtained.

In Figs. 1 and 3 A, A, are the malleable iron blades *b*, the intermediate plate of brass, German silver or other composition or metal and S the steel all the parts being soldered firmly together.

In Fig. 2 the three several parts of the blade are represented separated and apart from each other showing their respective forms and relative positions.

It may perhaps be found advisable to dispense with the use of the intermediate plate *b*, in plate form and to substitute in place thereof the use of pulverized composition or solder, using the solder after the iron and steel are struck in the die, by placing it around the seam between those two parts then subjecting the whole to proper heat, when the solder fusing will faithfully follow the seam between the steel and iron and constitute an intermediate plate precisely the same as occurs from the use of the plate *b* in plate form as before described.

I do not claim generally the soldering of a steel plate onto malleable iron by means of brass or any other metal, but What I do claim as new and of my own invention and desire to secure by Letters Patent is—

1. The forming of the blades of scissors or shears by means of the use of the intermediate plate $b$ or by soldering or brazing the malleable cast iron and steel together substantially in the manner and for the purpose herein described.

2. I also claim in the manufacturing of scissors or shears the use of the die as before mentioned and the striking together and into the required line and shape the component parts of the blades substantially in the manner and for the purpose herein described.

HENRY HAVELL.

Witnesses:
   DANIEL F. TOMPKINS,
   SARAH L. TOMPKINS.